United States Patent Office 3,515,250
Patented June 2, 1970

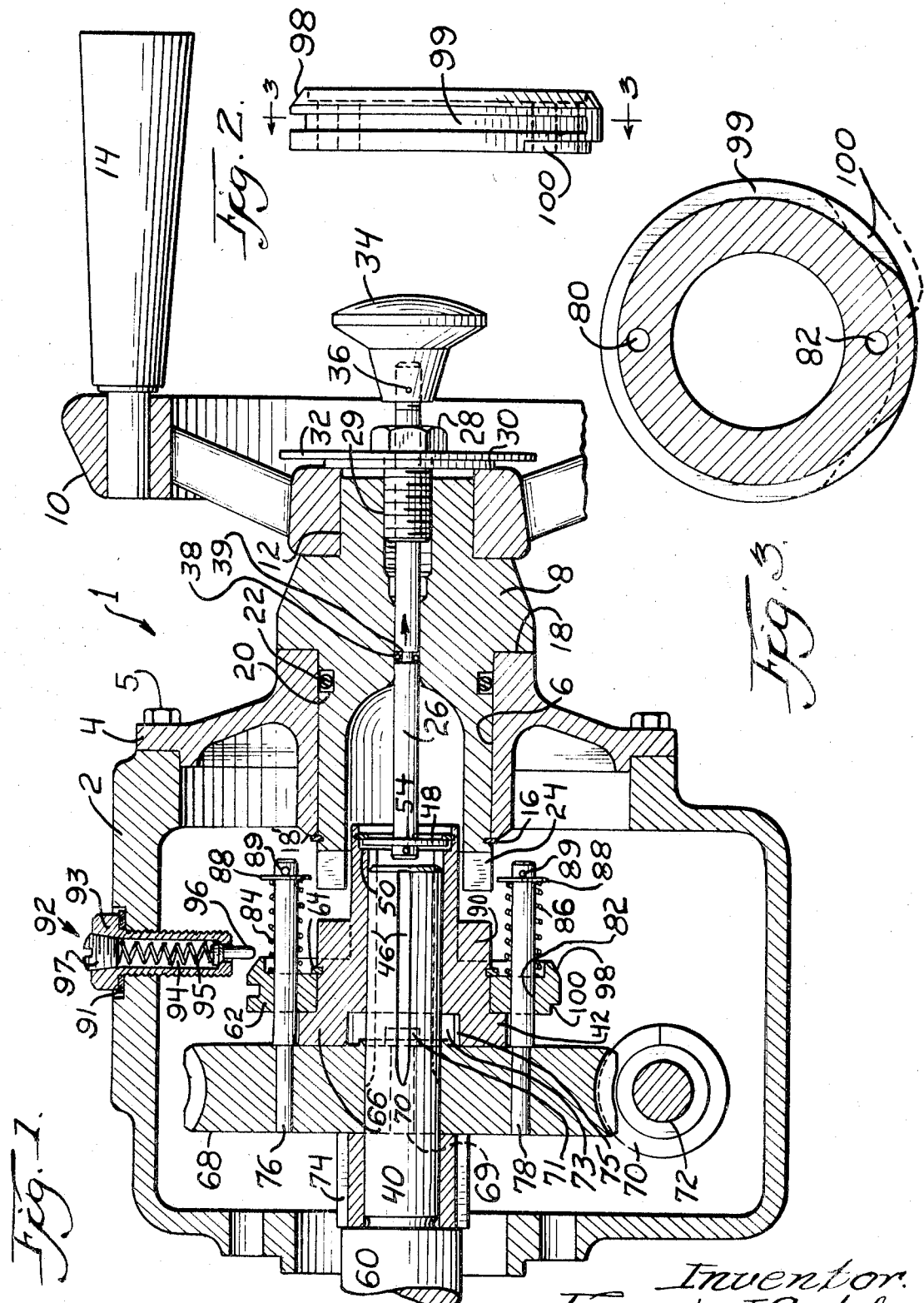

3,515,250
DECLUTCHING MECHANISM
Francis J. Cantalupo, Oak Park, Ill., assignor to Crane Co., Chicago, Ill., a corporation of Illinois
Filed Dec. 30, 1968, Ser. No. 787,663
Int. Cl. F16d *11/04;* F16k *31/53;* F16h *3/36*
U.S. Cl. 192—48.91                 9 Claims

ABSTRACT OF THE DISCLOSURE

The invention is directed to mechanism having associated relation with a valve operator for selectively actuating a valve either manually, by means of a handwheel, or by power means such as an electric motor, and wherein actuation of the power means will automatically disengage the driving engagement of the valve with the handwheel.

---

This invention relates to actuating mechanism for valves and has reference in particular to declutching mechanism by which the respective valve may be selectively operated either manually by rotation of the customary handwheel or by power means such as an electric motor.

The declutching mechanism of the invention is related to valve operators in general such as the type disclosed in the U.S. Pat. 3,234,818, issued on Feb. 15, 1966, to Cantalupo and Doelger, entitled "Valve Operating Mechanism," and wherein a source of power means is normally utilized to position the valve member due to the size of the member, the corresponding torque requirements for its actuation, accessibility, or for other reasons. Such declutching mechanism allows the valve to be actuated manually if so desired, or necessarily, as in the event of a power failure.

The declutching arrangement herein disclosed provides for selective operation of a valve either manually as by means of a handwheel or by power means such as by an electric motor. When the motor drive is effective the hand operating means is disconnected and when the said hand operating means are effective the motor drive is disconnected.

The present arrangements for such declutching devices normally utilize a clutch member which is axially movable by a hand lever to thereby provide a driving connection between the valve stem and the handwheel. The clutch member is then automatically released by some types of spring actuating means when the power means is subsequently energized. Heretofore the release means has been a trip lever arrangement such as shown in Pat. 3,234,818 heretofore identified. Yoke arrangements which shift a yoke sleeve between manual driving means and power driving means are also common, as are centrifugal declutching means. Such arrangements, however, incorporate certain disadvantages due to the fact that they rely on proper positioning of the members or on relative rotation between the members. The said arrangements also employ complicated linkages between the power means and the manual means to effect operation.

The basic objective of the invention is to provide drive mechanism of the character described which will incorporate novel declutching means for shifting operation of the valve shaft from hand operation to motor operation and wherein such action will take place automatically should the power means become energized.

A more specific object of the invention resides in the provision of declutching means for drive mechanism of the character described wherein a simple and effective detent arrangement is employed for latching a clutch ring to hold the same operative for manual handwheel operation, and whereby when the clutch ring is released by a declutching action the power means is automatically made operative for producing actuation of the valve shaft.

Another object of the invention is to provide drive mechanism such as described which will incorporate declutching means in the form of a clutch ring having a groove in its outer periphery for latching engagement by a detent arrangement. Upon energization of the power means the clutch ring is thereupon released from the detent arrangement due to the camming action of the groove, thereby permitting the ring to axially reposition itself so as to render the power means effective as the driving instrumentality.

Another object of the invention resides in the provision of declutching mechanism for valve drive means which will require the operator to effect a latching engagement of the clutch ring with the detent arrangement before handwheel operation of the valve shaft is possible, but wherein the clutch ring is automatically released upon limited rotation of the parts should the power means become energized during said handwheel operation.

With these and various other objects in view the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIG. 1 is a cross-sectional view of drive mechanism incorporating the improvements of the invention including a declutching ring, a detent arrangement and an actuator knob, the mechanism being shown in position wherein the valve stem is driven by the power means;

FIG. 2 is a side elevational view of the declutching ring showing the peripheral cam groove therein; and FIG. 3 is a sectional view taken substantially along line 3—3 of FIG. 2.

With reference to the drawing, and in particular FIG. 1, the declutching mechanism, generally indicated by reference numeral 1, is enclosed by housing 2 which includes a cover 4 having a journal portion 6 for accepting a rotatable handwheel hub 8. The cover 4 is secured to the housing by screw means 5, as shown. A handwheel 10 is positioned on an outer polygonal portion 12 of the hub 8 to thereby provide a driving connection between the said hub and handwheel. A crank handle 14 is secured to the handwheel 10 to facilitate manipulation thereof.

Hub 8 is rotatably positioned in cover 4 and is prevented from axial movement by retaining ring 16 and shoulder 18, the latter of which abuts cover 4. Shoulders 18 and 18′ thus axially restrict hub 8. An O-ring 20, positioned in recess 22 of hub 8 provides a seal between the said hub and cover. On the end portion of the hub 8 opposite the handwheel are a plurality of lugs 24, to be hereinafter described.

A declutch shaft 26 is centrally positioned and journaled in hub 8. Cap screw means 28 has a central bore 29 therein which permits the shaft 26 to extend therethrough. The cap screw 28 is threadedly engaged in hub 8 and provides additional journalling and support for the shaft 26. The head portion of cap screw 28 also serves to retain handwheel 10 by means of washer 30 which spans and overlaps the polygonal portion 12 of the hub and handwheel. It is apparent that tightening of the cap screw 28 will secure the handwheel 10 to hub 8. An identification plate 32 is interposed between the said cap screw and washer. Knob 34 provides a convenient means for gripping and axially positioning the shaft 26 for purposes to be hereinafter described. The knob 34 may be secured to shaft 26 by a pin 36 or any other suitable means. O-ring 38 positioned in shaft recess 39 provides a seal between the said shaft and hub 8 in a conventional manner.

Declutch shaft 26 is secured to clutch member 42 which is slidably splined to clutch shaft 40. Spline means 46 between the shaft 40 and member 42 permits the said member to be axially positioned on shaft 40 in a plurality of positions depending on whether the said shaft is actuated by the handwheel, or, by a power means. Declutch shaft 26 is secured to the clutch member 42 by means of a washer 48 which is placed over the shaft 26 and is positioned between a shoulder portion 50 of recess 52 and retaining ring 54 which is spring urged into annular groove 56 in a conventional manner. Pin 58, secured to shaft 26, allows the shaft to axially position the clutch member 42 in the direction shown by the arrow in FIG. 1 as the pin carries the washer 48 which subsequently carries the retaining ring 54, the latter being secured to the clutch member as aforementioned.

An extension of clutch shaft 40 provides a pinion end 60 which may be used to drive a bevel gear, not shown, which in turn causes the rotation of a yoke sleeve to effect vertical movement of a valve stem, also not shown. Since the novelty of the instant device resides in the declutch mechanism, only the latter is illustrated and described herein. The cooperation of the instant mechanism with a valve operator, which include the above identified elements not shown, may be appreciated by reference to Pat. No. 3,234,818 herein previously identified.

An annular declutch ring 62 is positioned on and secured to clutch member 42 to prevent axial movement relative thereto so that the ring will axially move integrally with the said member. A retaining ring 64 confines the declutch ring against shoulder portion 66 of clutch member 42. It is noted that although relative axial movement between the ring 62 and member 42 is prevented, relative rotation between these members is allowed, as explained hereinafter.

Worm gear 68 is freely rotatable on clutch shaft 40 so that rotation independently of the shaft 40 is possible. However, releasable interconnecting means between the worm gear 68 and the clutch member 42 is provided. Lug means 71 is integral with pin 69 and extends into annular recess 73 of clutch member 42 to form a driving connection between said gear and member when the lug 71 is bodily rotated and engages an internal lug 75 positioned on the periphery of recess 73. Gear 68 meshes with worm drive gear 70 which is mounted and keyed to drive shaft 72, the said shaft being driven by a power means such as an electric motor, not shown. Similarly, take-off gear 74 is secured to clutch shaft 40 for engaging a take-off pinion, not shown. Such gear may be used for the purpose of actuating a geared limit switch to thereby limit the travel of a yoke sleeve actuated by the shaft 40. Such limit devices are well known in the art and comprise no part of the instant application.

Worm gear 68 has a pair of worm gear pin means 76, 78 which axially extend from equally disposed radial positions in the said gear. The pin means 76, 78 may be secured to the gear by any suitable means such as welding, shrinking, or, threadedly engaged. The pins 76, 78 extend through holes 80, 82, respectively, of declutch ring 62 so that the gear 68 and ring 62 rotate together.

As shown in FIG. 1, clutch member 42 abuts worm gear 68 since the spring means 84, 86 surrounding pins 76 and 78, respectively, are each confined between the ring 62 and a stop washer 88 which is retained on its respective worm gear pin means by pins 89, respectively, to thereby urge the ring 62 and clutch member 42 toward gear 68.

Clutch member 42 is adapted to selectively engage one of two sets of drive lugs to enable positioning of a valve member either manually or by power means. The instant device has a power preference so that manual positioning cannot be conveniently accomplished if the power means is energized. Accordingly, to selectively engage one of two sets of drive lugs, two separate sets of lugs are located on the member 42. In FIG. 1, the device is shown in the power preference position whereby cltuch shaft 40 is rotated by power means via drive gear 70, worm gear 68, and clutch member 42 which is splined to shaft 40. The driving means between the gear 68 and clutch member 42 is accomplished by the engagement of lug 71, which is part of pin 69, and, lugs 75, positioned in recess 73 of the said member.

To manually actuate the shaft 40 it is necessary to separate the lugs 71, 75 by axially positioning the clutch member 42 in the direction shown by the arrow by pulling knob 43. Upon separation of lugs 71, 75 and upon further axial movement of said clutch member, a second set of lugs 90 on clutch member 42 opposite the set of first lugs, will engage lugs 24 on hub 8 to thereby enable the shaft 40 to be manually actuated by handwheel 10 which drives hub 8 thereby driving clutch member 42 which is slidably splined to shaft 40.

To retain the declutching device in manual position a detent means 92 is provided the same comprising a detent holder 93 in the form of a cap screw threadedly engaged in housing 2 and having a central chamber 94 therein with a spring 95 confined between a plunger 96 and plug screw 97. The spring urges the plunger to protrude beyond the end of the said holder. A seal 91 is positioned between the said holder 93 and housing 2, as shown. It is appreciated that when the clutch member 42 and retaining ring 62 are axially moved into manual operation, the ring will compress springs 84, 86 and the cam portion 98 on the outer periphery of the ring 62 will move plunger 96 upwardly until plunger engages either groove means 99 or 100 of retainer ring 62 at which time the detent means will function to retain by latching the said ring and clutch member 42 in a position for manual operation via handwheel 10, hub 8, clutch 42 and shaft 40. The driving means between the hub 8 and clutch member 42 being the engagement of lugs 24 and 90, the former a part of hub 8, the latter a part of member 42.

In the normal operation of the drive means of the invention, the motor will be energized and operative to drive the shaft 72, the worm gear 68, the clutch member 42 and thus the valve shaft 40 by reason of the interengaging lugs 71 and 75. Should it become necessary to rotate the valve shaft 40 manually by the handwheel 10, as for example, by reason of a power failure or should other reasons exist for manual actuation, the operator will pupull on the knob 34 to move the clutch member 42 and ring 62 in a direction to the right, FIG. 1. This will disengage the lugs 71 and 75 and make an operative engagement of lugs 90 with lugs 24. Simultaneously therewith the pin 96 of the detent arrangement is cammed by the clutch ring 62 and the pin is caused to drop into the peripheral groove 99. This latching of the clutch ring 62 allows the operator to release the knob 34 and the parts will remain latched with the lugs 90 and 24 in operative engagement. By rotating the handwheel 10 the operator can now rotate the shaft 40 since the drive will take place through the member 42 and the splines 46 to the shaft. It will be noted that this rotation is independent of the worm gear 68.

Since the groove 99 does not extend completely around the periphery of the clutch ring 62, see FIG. 3, the incident may occur wherein this area where the groope has been eliminated will align with the detent pin 96. In this situation the operator need only continue to pull on the knob 34 and eventually the pin 96 will drop into the edge groove 100. Either groove will effect a latching of the ring 62 and also the clutch member 42 for manual operation using the handwheel 10.

An additional feature of the invention resides in the fact that the clutch ring 62 is automatically released should the power means become energized. Assuming that the ring 62 is retained by the detent arrangement with the pin 96 having latching engagement in the groove 99. As described the valve shaft under these conditions can be rotated manually by the handwheel 10. However, in the event the power means should become operative, the worm gear 68 will be rotated to in turn rotate the clutch ring 62 which will turn on the member 42. This action takes place since the clutch ring 62 is connected to the worm gear 68 by the pin means 76 and 78. Rotation of the clutch ring will eventualy bring that portion of the ring not provided with the groove 99 into contact with the detent pin 96 and when this happens a declutching of the ring takes place so that the ring and member are automatically repositioned by the coil springs 84 and 86 and the motor means is rendered operative for driving the valve shaft. The edge groove 100 also disappears by gradually merging into the periphery of the clutch ring 62. Thus should it so happen that the detent 96 is in contact with groove 100, the rotation of the ring by the power means will also effect a declutching action of the clutch ring, it being understood that both grooves have a camming action designed for just this purpose.

The invention is not to be limited to or by details of construction of the particular embodiment thereof illustrated by the drawings as various other forms of the device will, of course, be apparent to those skilled in the art without departing from the spirit of the invention or the scope of the claims.

What is claimed is:

1. In drive means of the character described, the combination with a rotatably mounted shaft, of a drive member on the shaft for independent rotation and operatively connecting with motor driven means for driving the same, a hub portion mounted for rotation on the same axis as the shaft and adapted to be manually rotated, a clutch member located therebetween and having a splined relation with the shaft and movable axially for selective positions on the shaft, said clutch member in one selective position having operative connection with the drive member, said clutch member in a second selective position having operative connection with the hub portion, a clutch ring carried by the clutch member and having encircling relation thereon, detent means for latching and holding the clutch ring and clutch member in said second selective position whereby the shaft can be rotated by manual rotation of the hub portion, and said clutch ring having declutching means which are operative upon rotation of the clutch ring to effect release of the detent, whereby the ring and the clutch member following a declutching operation are free to move to the said one selective position in which position the clutch member is operatively connected to the drive member for rotating the shaft by the motor driven means.

2. In drive means of the character as defined by claim 1, wherein the clutch ring is rotatable on the clutch member but is held aaginst independent movement axially, and pin means for operatively connecting the drive member and the clutch ring for unitary rotation, whereby if the power means are energized to cause rotation of the drive member the clutch ring is thus rotated to effect a declutching operation in the event the clutch ring is latched and held by the detent means at the time.

3. In drive means of the character as defined by claim 2, additionally including resilient means in associated relation with the pin means which operatively connect the clutch ring with the drive member, said resilient means yieldingly biasing the clutch ring and clutch member into the said one selective position in which position the shaft is rotated by the motor means.

4. In drive means of the character described, the combination with a rotatably mounted shaft, of a drive member on the shaft for independent rotation, a hub portion mounted for rotation on the same axis as the shaft and adapted to be manually rotated, a clutch member in splined relation on the shaft and located between the drive member and the hub portion, lugs at one end of the clutch member for interconnecting relation with lugs on the drive member, other lugs on the opposite end of the clutch member for interconnecting relation with lugs on the hub portion, means extending axially of the hub portion and connecting with the clutch member for selectively positioning the clutch member axially on the splined portion of the shaft, whereby to disconnect the lugs on the clutch member from the lugs on the drive member and for connecting the second mentioned lugs on the clutch member with the lugs on the hub portion or vice versa, a clutch ring carried by the clutch member and having encircling relation thereon, a connection between the ring and the drive member so that they rotate together but which permits the clutch ring to move axially with axial movement of the clutch member, and detent means for latching, the clutch ring and for holding the same and the clutch member in a selected position for manual actuation where the lugs on the clutch member are in engagement with the lugs on the hub portion.

5. In drive means of the character defined by claim 4, wherein the clutch ring is so constructed and arranged that upon rotation of the ring it effects a release from the detent means and a declutching of the ring and the clutch member from its position of manual actuation, and resilient means included in the connection between the ring and the drive member, whereby upon a declutching action the ring and clutch member are moved by said resilient means to a second selected position on the splined portion of the shaft disconnecting the lugs on the clutch member from those on the hub portion and connecting the first mentioned lugs on the clutch member with the lugs on the drive member.

6. In drive means of the character defined by claim 4, wherein the drive member is adapted to be rotated by motor means, whereby when the clutch member is selectively positioned on the splined portion of the shaft so that the lugs on the clutch member interconnect with the lugs on the drive member the shaft will be driven by the motor means.

7. In drive means of the character defined by claim 4, wherein the clutch ring is so constructed and arranged that upon rotation of the ring it effects a release from the detent means and a declutching of the ring and the clutch member from its position for manual actuation, resilient means included in the connection between the rings and the drive member, whereby upon a declutching action the ring and clutch member are moved by said resilient means to a second selected position on the splined portion of the shaft disconnecting the lugs on the clutch member from those on the hub portion and connecting the first mentioned lugs on the clutch member with the lugs on the drive member, and additionally including motor driven means for driving the said drive member, whereby when the ring and clutch member are located in said second selected position the shaft will be driven by said motor driven means.

8. In drive means of the character described, the combination with a rotatably mounted shaft, of a drive member on the shaft for independent rotation, a clutch member on the shaft and having a splined relation therewith, interengaging lugs on the clutch member and drive member respectively, a rotatable hub portion adapted to be manually rotated, interengaging lugs on the hub portion and on the clutch member respectively, a reciprocable rod extending axially of the hub portion and operatively connecting with the clutch member for moving the member axially on the splined part of the rotatably mounted shaft, a clutch ring carried by the clutch member and having encircling relation thereon, pin means connecting the clutch ring with the drive member in a manner providing for rotation of both parts as a unit and also movement of the clutch ring axially when the clutch member is moved axially, and detent means operative to latch the clutch ring and clutch member in a predetermined position on the splined portion of the shaft effected by actuation of the reciprocable rod, whereby the lugs on the clutch member are disconnected from the lugs on the drive member and whereby the second mentioned lugs on the clutch member are connected with the lugs on the hub portion for manual actuation of the shaft.

9. In drive means of the character as defined by claim 8, wherein the clutch ring is so constructed and arranged that upon rotation of the ring it effects a release from the detent means and a declutching of the ring and the clutch member from its position for manual actuation, resilient means included in the pin connections between the ring and the drive member, whereby upon a declutching action the ring and clutch member are moved by said resilient means to a second selected position on the splined portion of the shaft disconnecting the lugs on the clutch member from those on the hub portion and connecting the first mentioned lugs on the clutch member with the lugs on the drive member, and additionally including motor driven means for driving the said drive member, whereby when the ring and clutch member are located in said second selected position the shaft will be driven by said motor driven means.

References Cited

UNITED STATES PATENTS

| | | | |
|---|---|---|---|
| 2,349,239 | 5/1944 | Clements | 192—48.91 |
| 2,619,208 | 11/1952 | Gerst | 192—48.91 |
| 2,753,736 | 7/1956 | Mitchell | 74—625 |
| 2,775,908 | 1/1957 | Elliott et al. | 74—625 |
| 2,846,038 | 8/1958 | Brownyer | 192—48.91 |
| 3,168,841 | 2/1965 | Caldwell et al. | 74—625 |

CARLTON R. CROYLE, Primary Examiner

A. D. HERRMANN, Assistant Examiner

U.S. Cl. X.R.

74—625; 192—114; 251—130